Dec. 5, 1933.   H. R. SNOW   1,938,118
FRACTIONATION OF HYDROCARBON OILS
Filed Sept. 19, 1930   2 Sheets-Sheet 1
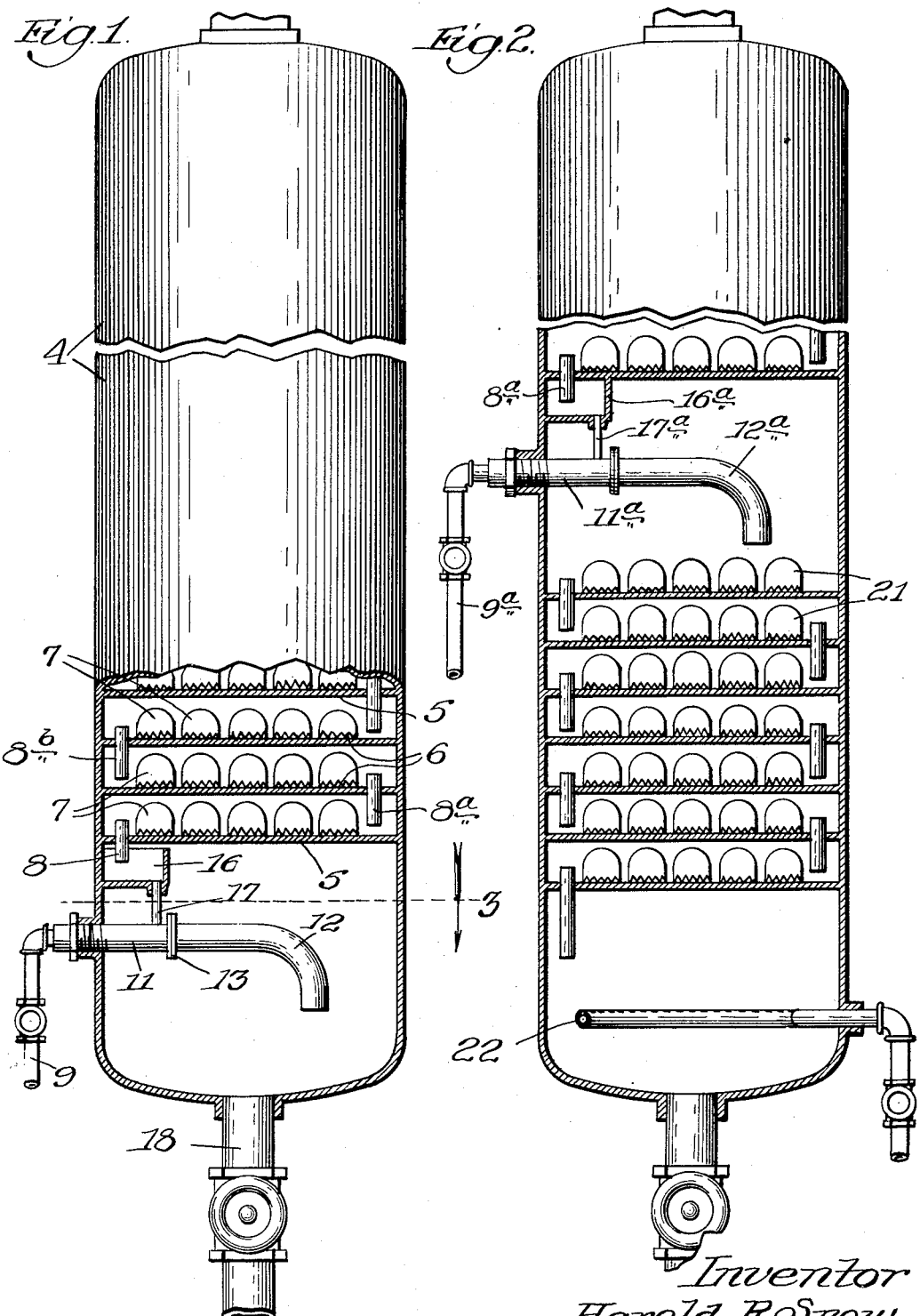

Dec. 5, 1933.  H. R. SNOW  1,938,118
FRACTIONATION OF HYDROCARBON OILS
Filed Sept. 19, 1930   2 Sheets-Sheet 2
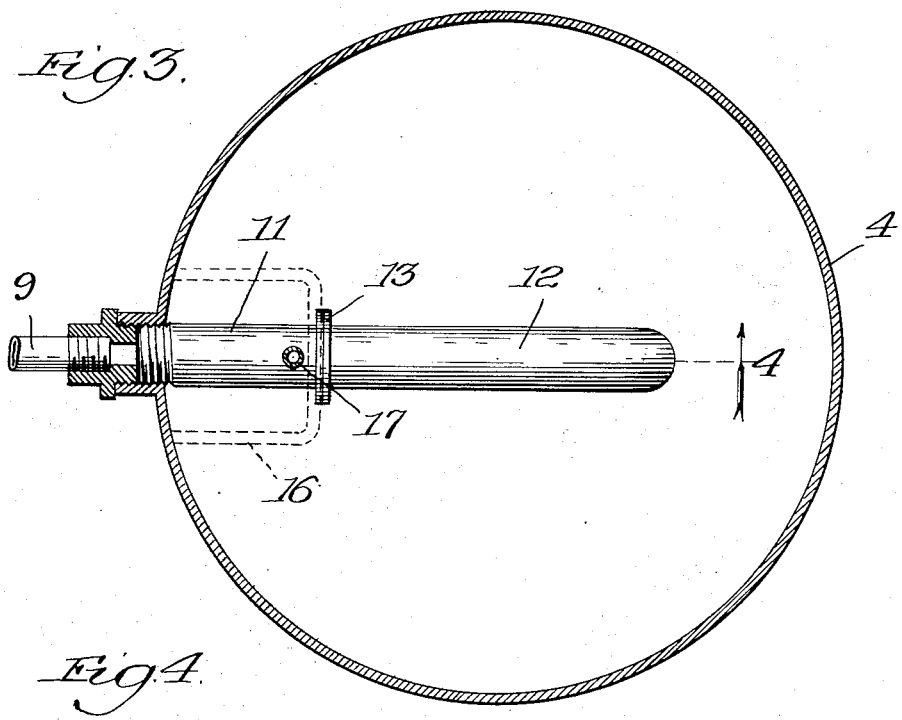
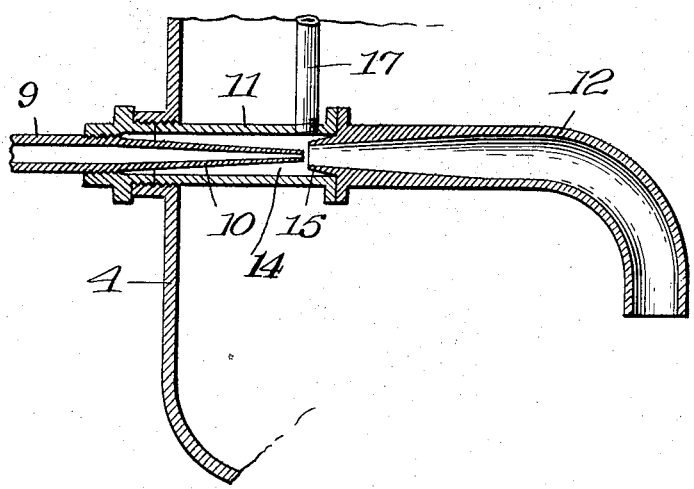
Inventor:
Harold R Snow Patented Dec. 5, 1933

1,938,118

UNITED STATES PATENT OFFICE 1,938,118

FRACTIONATION OF HYDROCARBON OILS

Harold R. Snow, Hammond, Ind., assignor to Standard Oil Company, Chicago, Ill., a corporation of Indiana Application September 19, 1930
Serial No. 483,111

7 Claims. (Cl. 196—139)

This invention relates to improvements in towers for the fractionation of volatile hydrocarbon oils and, more particularly, to a method of introducing hot vapors from a cracking still into a fractionating tower.

This invention will be fully understood from the following description illustrated by the accompanying drawings, in which:

Figure 1 is an elevation, partly in section, of a fractionating tower provided with a vapor inlet nozzle below the bottom plate of the tower;

Fig. 2 is an elevation, partly in section, of a fractionating column equipped with stripping means in which the vapor inlet nozzle is located intermediate the fractionating and stripping means;

Fig. 3 is a transverse view partly in section of the inlet nozzle construction taken on line 3 of Fig. 1 and Fig. 4 is a fragmentary vertical sectional view taken on line 4 of Fig. 3 and shows in detail the construction of the inlet nozzle.

Referring to Fig. 1 of the drawings, numeral 4 designates a well-known type of fractionating column having a plurality of vertically disposed bubble cap plates 5, each of which is provided with vapor passages 6 topped by heads 7 which are serrated near the bottom of the plate. A constant level of liquid is maintained on the plates by means of a series of overflow pipes 8, 8ª and 8ᵇ, each of which discharges into the next lower plate, the lowermost discharging into a reservoir 16, suitably secured, as by welding, to the wall of the column. Outgoing vapors pass from the upper end of the column to a condenser (not shown).

A conduit 9 leading, for example, from a cracking still or reaction chamber, enters the lower portion of the column 4 below the bottom plate and terminates in a tapered nozzle 10. The tapered nozzle 10 is surrounded by a cylindrical casing or shell 11, to the end of which is secured, as by flanges 13, a terminal section 12. Casing 11 is secured to the wall of the fractionating column. The space between it and the nozzle 10 constitutes the chamber 14 to which reflux condensate from the reservoir 16 is fed through pipe 17. Terminal section 12 has interiorly a diverging conical form at its inlet side and is preferably provided with a downwardly opening elbow at its outlet for the downward discharge of the mixed vapors and liquid. The inlet end of section 12 is formed of a truncated conical portion 15 projecting into casing 11, to a position near the end of the tapered nozzle 10. The opening at its end is somewhat larger than the end of nozzle 10, so that the vapors discharged from nozzle 10 into the opening of section 12 will draw into the latter liquid from the chamber 14 by ejector action.

The stream of thoroughly intermixed liquid and vapor passes through the elbow of the nozzle and is discharged downwardly. Unvaporized liquid is withdrawn through the outlet 18 at the base of the column. The reflux liquid collected in reservoir 16 is thus intimately mixed with vapors and the latter are cooled and the reflux reheated, the portion of the mixture remaining in the vapor form passing upwardly through the column for fractionation.

By the use of the apparatus and method herein described, objectionable deposits of coke which tend to form within and upon the vapor inlet of the fractionating column and also adjacent certain portions of the interior of the column are substantially eliminated. It is to be noted that the liquid which is mixed with the vapors consists of condensate from the fractionating plates and is substantially free from asphaltic matter.

As shown in Fig. 2, my invention also may be utilized in fractionating towers in which the vapor inlet is located intermediate condensing and stripping means. The reflux from the upper bubble plates is collected at 16ª and intermixed with the incoming vapor stream in the manner heretofore described, the parts of the device corresponding to those of Fig. 1, being designated in Fig. 2 by the same numerals with the suffix a. The unvaporized material issuing from the nozzle 12ª descends upon the plates designated 21. Steam may be injected through the perforated pipe 22 in the lower part of the column to effectively strip the descending liquid of all its light ends, which pass up through the upper bubble plates with the material vaporized in the first instance, as previously described.

By the present invention, fractionation is aided, and in the case of vapors introduced at cracking temperatures, for example, from a cracking still, formation of coke in the tower is materially reduced or eliminated. Furthermore, the formation and entrainment of tarry, asphaltic materials is largely avoided and a better quality of distillate is secured.

Although I have described the present invention in connection with a description of specific improvements thereof, it is not intended that the details set forth shall be regarded as limitations upon the scope of the invention, except in so far as included in the accompanying claims.

I claim:

1. In fractionating apparatus, means for introducing hydrocarbon oil vapors into a fractionating column having vertically-spaced fractionating plates, which comprises a vapor inlet member entering the column below fractionating plates therein, and means for feeding condensate substantially free from asphaltic matter from the fractionating plates within the column directly into the inlet member to mix therein with the incoming vapors before discharge into the fractionating column.

2. In fractionating apparatus, means for introducing hydrocarbon oil vapors into a fractionating tower having vertically-spaced fractionating plates, which comprises a vapor conduit member entering the column and terminating in a nozzle located intermediate fractionating plates within said tower, a conduit for feeding reflux substantially free from asphaltic matter from the lowermost plate above said nozzle into the latter, and means within said nozzle for intimately admixing the incoming vapors and the reflux from said lowermost plate.

3. In the fractionation of hydrocarbon oil vapors wherein the hot vapors are introduced into a fractionating column, the step of admixing with the vapors before discharge thereinto hot reflux formed within said column directly above the point of introduction of the vapors, said reflux being substantially free from asphaltic matter.

4. The method of fractionating hydrocarbon oil vapors which comprises passing the vapors through a confined discharge passage into a fractionating column, in which the vapors ascend and are cooled with formation of condensate, collecting such condensate formed just above the point of introduction of the vapors and introducing said collected condensate while hot into said confined discharge passage to mix with the vapors therein passing into the column.

5. The method of fractionating hydrocarbon oil vapors which comprises introducing said vapors into a fractionating zone wherein the vapors pass consecutively through spaced pools of reflux condensate formed during fractionation and mixing with said vapors, just prior to their release into said zone, reflux condensate withdrawn from a pool next adjacent to the point of introduction of said vapors into said zone.

6. In fractionating apparatus, a fractionating column comprising means for counter-currently contacting vapors and reflux to separate a light fraction as vapors from a heavier fraction as condensate, a vapor inlet for introducing into the column the vapors to be fractionated, and means for introducing reflux from said contacting means directly into said vapor inlet to mix with the vapors therein.

7. In the fractionation of hydrocarbon oil vapors wherein hot vapors, containing asphaltic matter, are introduced into a fractionating column, the step of admixing reflux formed within said column and free from asphaltic matter, with said vapors directly before their discharge thereinto.

HAROLD R. SNOW.